United States Patent [19]

Sato

[11] Patent Number: 4,793,890
[45] Date of Patent: Dec. 27, 1988

[54] AUTOMATIC JOINING APPARATUS FOR A CARCASS PLY

[75] Inventor: Hidemasa Sato, Nagasaki, Japan

[73] Assignee: Mitsubishi Jukogyo Kabushiki Kaisha, Tokyo, Japan

[21] Appl. No.: 122,847

[22] Filed: Nov. 19, 1987

[30] Foreign Application Priority Data

Mar. 20, 1987 [JP] Japan .................... 62-40089[U]

[51] Int. Cl.⁴ .............. B29D 30/06; B29D 23/00; B29C 69/00; B31F 5/00
[52] U.S. Cl. ................... 156/405.1; 29/132; 156/203; 156/218; 156/304.1; 156/466; 156/494; 156/502; 156/507; 156/544
[58] Field of Search ............ 156/405.1, 421, 494, 156/502, 507, 544, 582, 304.1, 304.6, 446, 203157, 159, 217, 218, 466; 221/212, 217; 29/132, DIG. 105

[56] References Cited

U.S. PATENT DOCUMENTS

| | | | |
|---|---|---|---|
| 1,436,023 | 11/1922 | Elmendorf | 156/544 |
| 2,348,803 | 5/1944 | Friz | 156/544 |
| 2,556,476 | 6/1951 | Lamport | 156/391 |
| 2,702,070 | 2/1955 | Lindemann | 156/502 |
| 3,909,341 | 9/1975 | Moscovita | 156/502 |
| 4,231,836 | 11/1980 | Ljungqvist | 156/421 X |
| 4,409,872 | 10/1983 | Bertoldo | 156/405.1 X |
| 4,454,000 | 6/1984 | Schlemmer | 156/502 |
| 4,478,672 | 10/1984 | Precht | 156/421 |
| 4,504,337 | 3/1985 | Askam et al. | 156/405.1 X |
| 4,608,737 | 9/1986 | Parks et al. | 29/132 X |

FOREIGN PATENT DOCUMENTS

59-174341 10/1984 Japan .
60-31661 7/1985 Japan .

*Primary Examiner*—David Simmons
*Assistant Examiner*—Thomas Bokan
*Attorney, Agent, or Firm*—Bernard, Rothwell & Brown

[57] ABSTRACT

An automatic joining apparatus for automatically joining an attachment start edge and an attachment finish edge of a carcass play cut into a length somewhat shorter than a circumferential length of a former drum and wound around the former drum, is disclosed. The apparatus comprises a pair of magnet-containing drive rollers movable in the axial direction of the former drum while being held in contact with the proximity of the attachment start edge of the carcass ply and the proximity of the attachment finish edge thereof to join the attachment start edge and the attachment finish edge together, and a pair of gathering rollers movable in the axial direction of the former drum behind the magnet-containing drive rollers while being held in contact with the proximity of the attachment start edge and the proximity of the attachment finish edge to join the attachment start edge and the attachment finish edge together.

3 Claims, 4 Drawing Sheets

AUTOMATIC JOINING APPARATUS FOR A CARCASS PLY

BACKGROUND OF THE INVENTION

1. Field of the Invention:

The present invention relates to an automatic joining apparatus for automatically joining an attachment start edge and an attachment finish edge of a carcass ply cut into a length somewhat shorter than a circumferential length of a former drum and wound around an outer circumferential surface of the former drum.

2. Description of the Prior Art:

At first, an apparatus for attaching a carcass ply onto a former drum in the prior art will be explained with reference to FIG. 11. In this figure, reference character (a) denotes a former drum, character (b) denotes a tray, character (c) denotes a carcass ply, character (d) denotes an intermediate table, character (e) denotes a festoon, character (f) denotes a liner roll, character (g) denotes a stock roll, character (h) denotes a let-off and character (F) denotes a floor surface. The carcass ply (c) is paid off from the stock roll (g) through the path consisting of the festoon (e)→the intermediate table (d)→the tray (b), an attachment start edge portion of the carcass ply (c) is attached onto the former drum (a) by hand work of an operator, and when the former drum (a) has revolved one revolution and the carcass ply has been wound around the former drum (a), the carcass ply is cut at a location between one cord $(c_1)$ and an adjacent cord $(c_1)$ by means of a heated knife or the like. Subsequently, the attachment start edge and the attachment finish edge of the carcass ply are joined to each other while adjusting the seam so that unevenness may not occur in the amount of lap of the seam, and then the joined portion is pressed by means of a hand roller.

In the carcass ply attaching apparatus in the prior art shown in FIG. 11, when the former drum (a) has revolved one revolution, the carcass ply is cut by means of a heated knife or the like at the location between one cord $(c_1)$ and an adjacent cord $(c_1)$, but with respect to an ideal cut line consisting of a straight line passing through center points of the intervals between adjacent cords, a passageway of the heated knife would be displaced, hence the carcass ply (c) would be cut along a line deviated to either direction from the ideal cut line, and so, a cut length ($L_2$ in FIG. 12) of the carcass ply (c) would have an error of the order of $\pm \frac{1}{2}$ of the pitch of the cord array with respect to a length (L) of a standard configuration. In addition, the carcass ply (c) after cutting would have local expansion or contraction in addition to overall expansion or contraction, and due to these expansion or contraction also, the attachment start edge and the attachment finish edge would not become straight. Consequently, an amount of lap of the seam between the attachment start edge and the attachment finish edge becomes uneven, and in the event that the amount of lap is insufficient, a joining strength is lowered, hence upon enlargement of a diameter during a shaping process, the joined portion is separated, and a scrap tire called "open cord" is produced. In addition, since an error arises at the cut portion and the attachment start edge and the attachment finish edge of the carcass ply (c) do not become straight, the cords $(c_1)$ would intersect or a density of cords $(c_1)$ would increase, and in this case also, the problem was present that scrap tires are produced.

SUMMARY OF THE INVENTION

It is therefore one object of the present invention to provide an automatic joining apparatus for a carcass ply which can firmly join an attachment start edge and an attachment finish edge of the carcass ply.

According to one feature of the present invention, there is provided an automatic joining apparatus for a carcass ply provided with a pair of magnet-containing drive rollers movable in an axial direction of a former drum while being held in contact with a proximity of an attachment start edge of the carcass ply and a proximity of an attachment finish edge thereof to join the attachment start edge and the attachment finish edge together when a carcass ply cut into a length somewhat shorter than a circumferential length of the former drum has been wound around an outer circumferential surface of the former drum, and a pair of gathering rollers movable in the axial direction of the former drum behind the respective magnetic containing drive rollers while being held in contact with the proximity of the attachment start edge and the proximity of the attachment finish edge to join the attachment start edge and the attachment finish edge together.

According to another feature of the present invention, there is provided the above-featured automatic joining apparatus for a carcass ply, wherein the pair of magnet-containing drive rollers are disposed in an inclined relation to each other so that an interval between the rollers may be reduced towards the rear in the moving direction of the rollers.

According to still another feature of the present invention, there is provided the first-featured automatic joining apparatus for a carcass ply, wherein the pair of gathering rollers are disposed in an inclined relation to each other in a V-shape manner with the interval therebetween enlarged towards the above or vertical direction.

Since the automatic joining apparatus for a carcass ply according to the present invention is constructed as described above, in operation, a carcass ply paid off from a carcass ply stock roller is cut into a length somewhat shorter than a circumferential length of a former drum, then the cut carcass ply is wound around an outer circumferential surface of the former drum, subsequently the pair of magnet-containing drve rollers are moved in the axial direction of the former drum while being held in contact with a proximity of the attachment start edge of the carcass ply and a proximity of the attachment finish edge thereof to join the attachment start edge and the attachment finish edge together, and also the pair of gathering rollers are moved in the axial direction of the former drum disposed behind the respective magnet-containing drive rollers while being held in contact with the proximity of the attachment start edge and the proximity of the attachment finish edge to join the attachment start edge and the attachment finish edge together.

According to the present invention, as the attachment start edge and the attachment finish edge of a carcass ply cut into a length somewhat shorter than a circumferential length of a former drum and wound around an outer circumferential surface of the former drum are joined together through the above-mentioned process, the attachment start edge and the attachment finish edge of the carcass ply can be joined firmly.

The above-mentioned and other objects, features and advantages of the present invention will become more apparent by reference to the following description of one preferred embodiment of the invention taken in conjunction with the accompanying drawings.

DESCRIPTION OF THE PREFERRED EMBODIMENT

Figure 1:
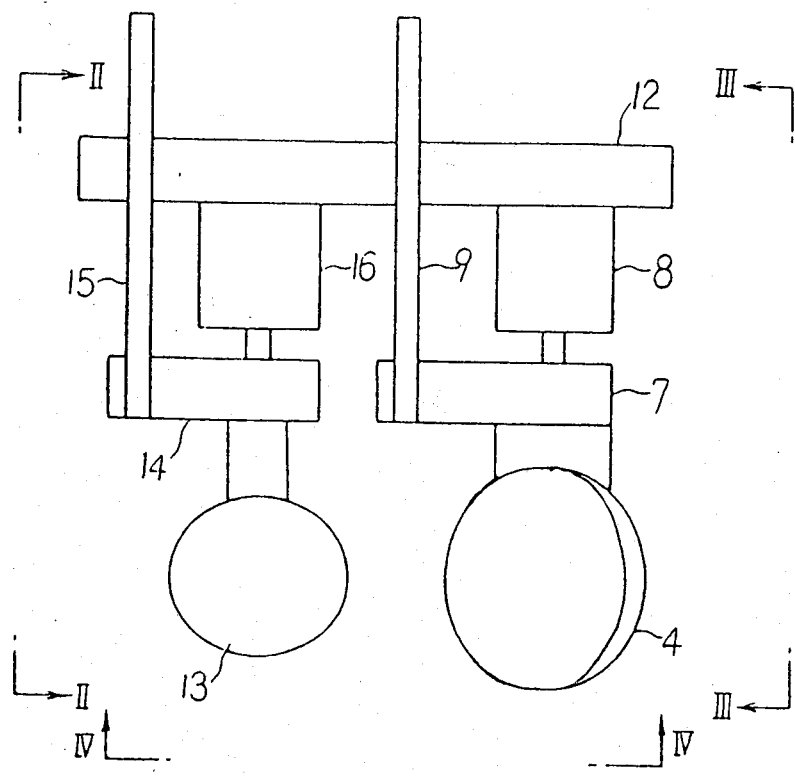
FIG. 1 is a side view showing one preferred embodiment of an automatic joining apparatus for a carcass ply according to the present invention.
Figure 2:
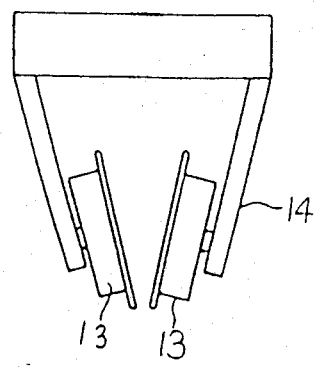
FIG. 2 is a rear view of gathering rollers taken along line II—II in FIG. 1 as viewed in the direction of arrows.
Figure 3:
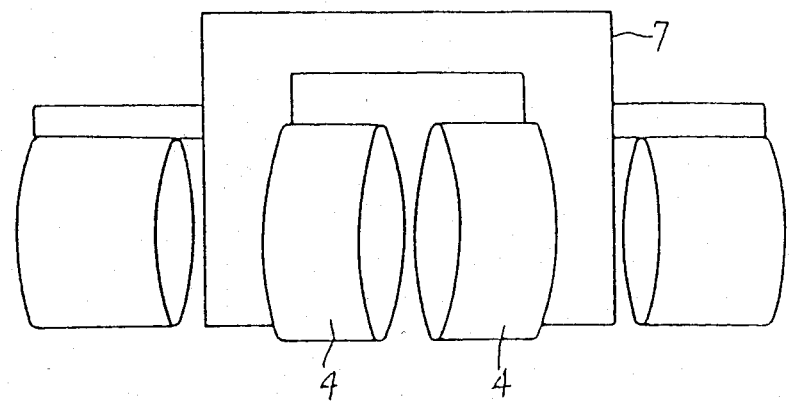
FIG. 3 is a front view of magnet-containing drive rollers taken along line III—III in FIG. 1 as viewed in the direction of arrows.
Figure 4:
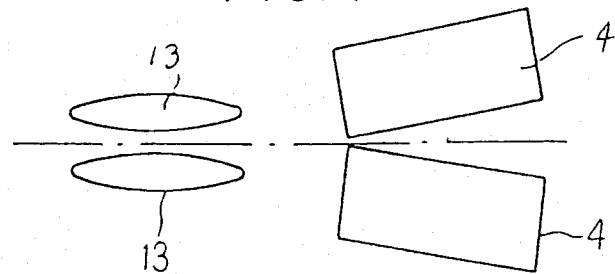
FIG. 4 is a plan view of the magnet-containing drive rollers and the gathering rollers.
Figure 5:
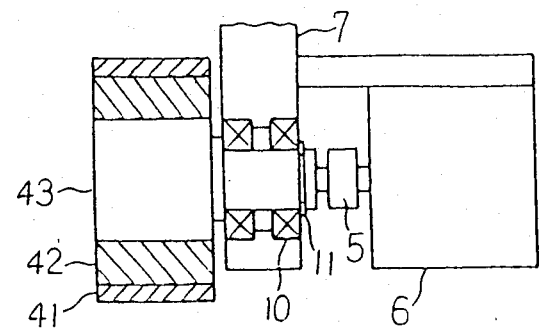
FIG. 5 is a longitudinal cross-section front view showing a drive system for the magnet-containing drive roller.
Figure 6:
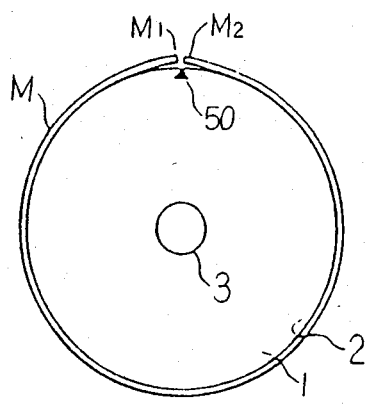
FIGS. 6 through 10 are schematic views to be used for explaining the operations of the magnet-containing drive rollers and the gathering rollers.
Figure 7:
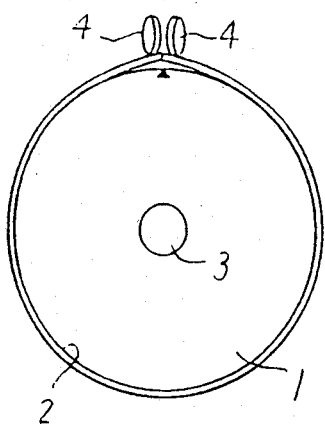
Figure 8:
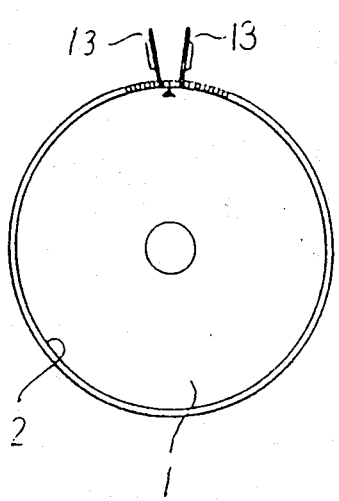

Now a construction of an automatic joining apparatus for a carcass ply according to the present invention will be described in more detail in connection to one preferred embodiment of the invention illustrated in FIGS. 1 to 10. In these figures, reference numeral (1) designates a former drum, numeral (2) designates an outer circumferential surface (forming surface) of the former drum (1), numeral (3) designates a rotary center shaft which rotatably supports the former drum (1), and this rotary center shaft (3) is rotatably supported by bearings of a housing which includes a driving device. In addition, reference numeral (4) designates a pair of magnet-containing drive rollers (that is, drive rollers each associated with a magnet therein), and this magnet-containing drive roller (4) is composed of an outer wheel (41), a magnet (42) and a rotary shaft (43). Furthermore, reference numeral (5) designates a shaft coupling, numeral (6) designates a motor associated with a reduction gear, numeral (7) designates a bracket, numeral (8) designates a hydraulic cylinder, numeral (9) designates a guide rod, numeral (10) designates a bearing, numeral (11) designates a retaining ring, numeral (12) designates a carriage, and the rotary shaft (43) of each magnet-containing drive roller (4) is rotatably supported by the bearing (10) mounted to the bracket (7) and is also connected to the motor (6) via the shaft coupling (5). In addition, the hydraulic cylinder (8) is mounted to the carriage (12), and the bracket (7) is mounted to the hydraulic cylinder (8), so that the bracket (7) can be raised or lowered as guided by the guide rod (9) fixedly secured to the carriage (12). Also, reference numeral (13) designates a pair of gathering rollers, numeral (14) designates a bracket, numeral (15) designates a guide rod, numeral (16) designates a hydraulic cylinder, the gathering rollers are rotatably supported by the bracket (14) via bearings not shown, the hydraulic cylinder (16) is mounted to the carriage (12), and the bracket (14) is mounted to the hydraulic cylinder (16), so that the bracket (14) can be raised or lowered as guided by the guide rod (15) fixedly secured to the carriage (12). The carriage (12) is adapted to be moved in the axial direction of the former drum (1) by means of a driving device and a guiding device not shown. In addition, reference character (M) denotes a carcass ply having steel cords buried therein which has been cut into a length somewhat shorter than a circumferential length of the former drum (1), character ($M_1$) denotes an attachment start edge of the carcass ply (M), character ($M_2$) denotes an attachment finish edge of the carcass ply (M), and reference numeral (50) denotes a reference position for winding of the carcass ply (M).

Figure 9:
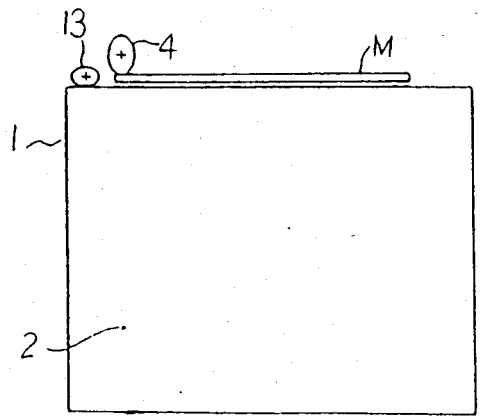
Figure 10:
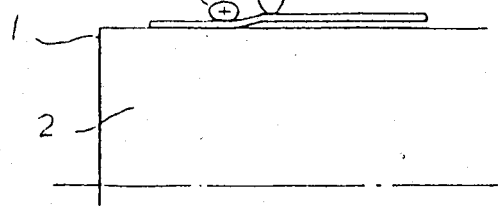
Figure 11:
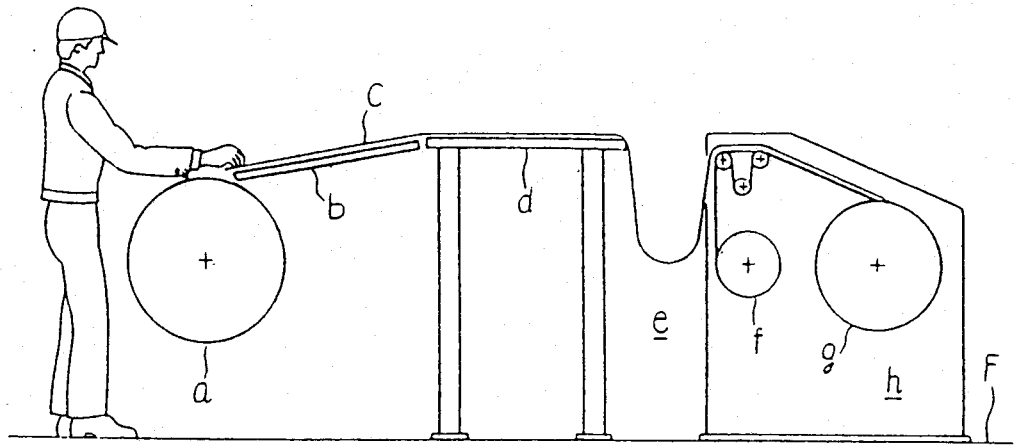
FIG. 11 is a side view showing an apparatus for attaching a carcass ply in the prior art.
Figure 12:
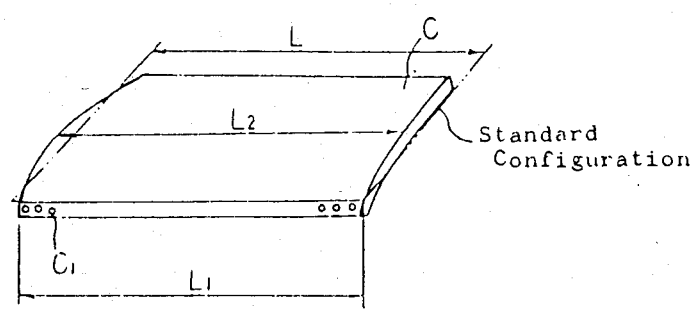
FIG. 12 is a perspective view showing a length of carcass ply.

Now, an operation of the automatic joining apparatus for a carcass ply illustrated in FIGS. 1 to 10 will be explained in greater detail. During the period when the former drum (1) revolves one revolution, the carcass ply (M) is wound by manual operation or automatically around the former drum (1) with reference to the winding reference position (50) (See FIG. 6). At this moment, the attachment start edge ($M_1$) and the attachment finish edge ($M_2$) of the carcass ply (M) do not come into tight contact with the outer circumferential surface of the former drum (1). When the former drum has stopped, the attachment start edge ($M_1$) and the attachment finish edge ($M_2$) are butted and joined. Now this joining operation will be explained. FIG. 9 shows the state where a pair of magnet-containing rollers (4) and a pair of gathering rollers (13) have been lowered and joining between the attachment start edge ($M_1$) and the attachment finish edge ($M_2$) is started. At this moment, a pair of magnet-containing drive rollers (4) are lowered and come close to the carcass ply (M), and so, the carcass ply (M) having steel cords buried therein is attracted by the magnet-containing drive rollers (4). Consequently, among the pair of magnet-containing drive rollers (4), the magnet-containing drive roller (4) on one side comes into contact with a proximity of the attachment start edge ($M_1$) and the magnet-containing roller (4) on the other side comes into contact with a proximity of the attachment finish edge ($M_2$) so as to slightly lift up these edges from the outer circumferential surface of the former drum (1) (See FIGS. 7 and 9). In addition, the pair of gathering rollers (13) come into contact with the carcass ply (M) so that the gathering roller (13) on one side may gather a steel cord in the proximity of the attachment start edge ($M_1$) and the gathering roller (13) on the other side may gather a steel cord in the proximity of the attachment finish edge ($M_2$) close to each other (See FIGS. 2 and 8). When the above-mentioned state has been realized, the carriage (12) is moved in the axial direction of the former drum (1), and at the same time, the respective magnet-containing drive rollers (4) are rotated at the same circumferential speed as the moving speed of the carriage (12). The respective magnet-containing drive rollers (4) are inclined with respect to each other in a V-shape as viewed in a plan view, so that the interval between the rollers may be reduced towards the rear in the moving direction of the rollers, and these rollers (4) serve to bring the attachment start edge ($M_1$) and the attachment finish edge ($M_2$) close to each other and join them together (See FIG. 7). On the other hnnd, the respective gathering rollers (13) moving behind the respective magnet-containing drive rollers (4) are inclined to each other in a V-shape as viewed in a front view, and these gathering rollers (13) serve to bring a steel cord in the proximity of the attachment start edge (M₁) and a steel cord in the proximity of the attachment finish edge (M₂) close to each other and to join the attachment start edge (M₁) and the attachment finish edge (M₂) together (See FIGS. 8 and 10). When the respective magnet-containing drive rollers (4) and the respective gathering rollers (13) have moved up to the other end surface of the former drum (1) and joining has been finished, the respective magnet-containing drive rollers (4) and the respective gathering rollers (13) would rise, and the carriage (12) is returned to its original position and performs the next joining operation. It is to be noted that the respective magnet-containing drive rollers (4) and the respective gathering rollers (13) could be provided in a plurality of columns to perform the joining operation more efficiently.

While a principle of the present invention has been described above in connection to one preferred embodiment illustrated in the accompanying drawings, it is intended that many changes and modifications can be made to the illustrated construction without departing from the spirit of the present invention.

What is claimed is:

1. An automatic joining apparatus for a carcass ply said automatic forming apparatus provided with a pair of magnet-containing drive rollers movable in an axial direction of a former drum while being held in contact with a proximity of an attachment start edge of the carcass ply and in contact with a proximity of an attachment finish edge thereof to join said attachment start edge and said attachment finish edge together when the carcass ply cut into a length somewhat shorter than a circumferential length of the former drum has been wound around an outer circumferential surface of the former drum, and a pair of gathering, rollers movable in the axial direction of the former drum disposed behind said respective magnet-containing drive rollers while being held in contact with the proximity of said attachment start edge and the proximity of the attachment finish edge to join said attachment start edge and said attachment finish edge together.

2. An automatic joining apparatus for a carcass ply as claimed in claim 1, wherein said pair of magnet-containing drive rollers are disposed in an inclined relation to each other so that an interval between said rollers is reduced towards the rear in the moving direction of said rollers.

3. An automatic joining apparatus for a carcass ply as claimed in claim 1, wherein said pair of gathering rollers are disposed in an inclined relation to each other in a V-shape manner with an interval therebetween enlarged towards the vertical direction.

* * * * *